US012634110B2

(12) United States Patent (10) Patent No.: US 12,634,110 B2
Takarabt et al. (45) Date of Patent: May 19, 2026

(54) METHOD AND SYSTEM FOR PROTECTING CRYPTOGRAPHIC OPERATIONS AGAINST SIDE-CHANNEL ATTACKS

(71) Applicant: SECURE-IC SAS, Cesson-Sevigne (FR)

(72) Inventors: Sofiane Takarabt, Arcueil (FR); Sylvain Guilley, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 221 days.

(21) Appl. No.: 18/212,372

(22) Filed: Jun. 21, 2023

(65) Prior Publication Data

US 2024/0187206 A1 Jun. 6, 2024

(30) Foreign Application Priority Data

Jun. 22, 2022 (EP) .................................... 22305906

(51) Int. Cl.
| | |
|---|---|
| *H04L 9/00* | (2022.01) |
| *H04L 9/06* | (2006.01) |
| *H04L 9/08* | (2006.01) |
| *H04L 9/30* | (2006.01) |

(52) U.S. Cl.
CPC ............ *H04L 9/002* (2013.01); *H04L 9/0618* (2013.01)

(58) Field of Classification Search
CPC ....... H04L 9/002; H04L 9/0618; H04L 9/085; H04L 9/3093; H04L 9/003; H04L 2209/046
See application file for complete search history.

(56) References Cited

U.S. PATENT DOCUMENTS

| | | | |
|---|---|---|---|
| 2015/0110266 A1* | 4/2015 | Debraize ............... | H04L 9/3242 380/30 |
| 2019/0050204 A1* | 2/2019 | Hutter ..................... | G06F 7/764 |
| 2020/0125333 A1* | 4/2020 | Vigilant ................. | H04L 9/003 |

OTHER PUBLICATIONS

Van Beirendonck, et al., "A Side-Channel Resistant Implementation of SABER", ACM Journal on Emerging Technologies in Computing Systems, vol. 17, Issue 2, 2021.

(Continued)

*Primary Examiner* — Vu V Tran
(74) *Attorney, Agent, or Firm* — Baker Hostetler

(57) ABSTRACT

A cryptographic system for executing operations of a cryptographic scheme applied to encrypt a data block is provided. The cryptographic system comprises a first sharing processing unit configured to execute an arithmetic sharing function applied to the data block and providing as an output a first and a second arithmetic share component. The cryptographic system further comprises a second sharing processing unit and a computation processing unit. The second sharing processing unit is configured to determine a random component and to execute a Boolean sharing function applied to the first arithmetic share component and to the random component and providing as an output an intermediate Boolean share component. The computation processing unit is configured to execute a recursive carry computation function configured to compute a first, a second and a third Boolean share component from the second arithmetic share component, the random component and the intermediate Boolean share component.

13 Claims, 11 Drawing Sheets

(56)            References Cited

OTHER PUBLICATIONS

Dubey, et al., "BoMaNet: Boolean Masking of an Entire Neural Network", 2020 IEEE/ACM International Conference on Computer Aided Design (ICCAD), 2020.

Fritzmann, et al., "Masked Accelerators and Instruction Set Extensions for Post-Quantum Cryptography", International Association for Cryptologic Research (IACR), 2021.

Mangard et al., "Power analysis attacks: revealing the secrets of smart cards", Springer, 2007.

Goubin, "A Sound Method for Switching between Boolean and Arithmetic Masking", Cryptographic Hardware and Embedded Systems—CHES 2001, Springer, 2001.

Nikova, et al., "Threshold Implementations Against Side-Channel Attacks and Glitches", International Conference on Information and Communications Security ICICS 2006: Information and Communications Security, 2006.

* cited by examiner

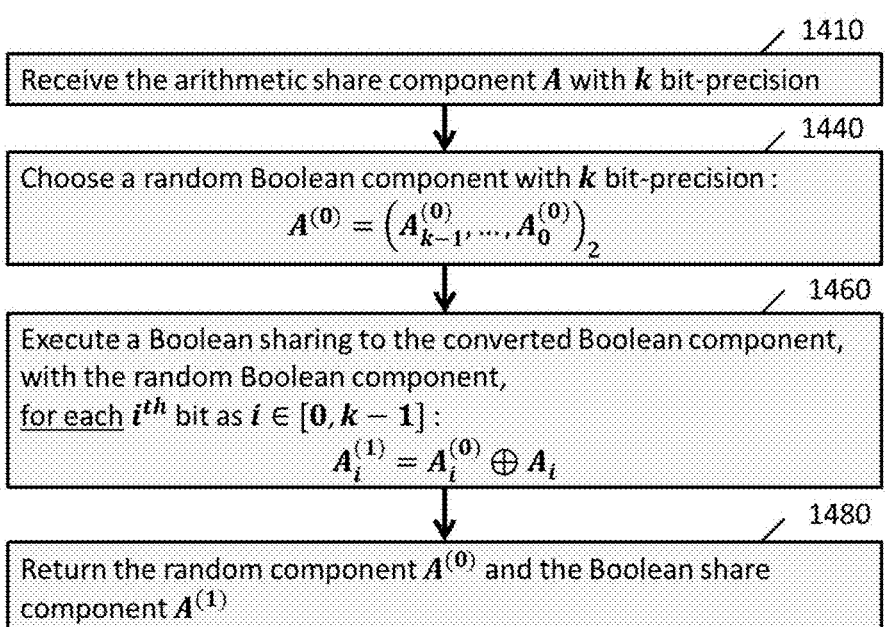

1410

Receive the arithmetic share component $A$ with $k$ bit-precision

1440

Choose a random Boolean component with $k$ bit-precision :

$$A^{(0)} = \left( A_{k-1}^{(0)}, ..., A_0^{(0)} \right)_2$$

1460

Execute a Boolean sharing to the converted Boolean component, with the random Boolean component,
for each $i^{th}$ bit as $i \in [0, k-1]$ :

$$A_i^{(1)} = A_i^{(0)} \oplus A_i$$

1480

Return the random component $A^{(0)}$ and the Boolean share component $A^{(1)}$

Fig. 9

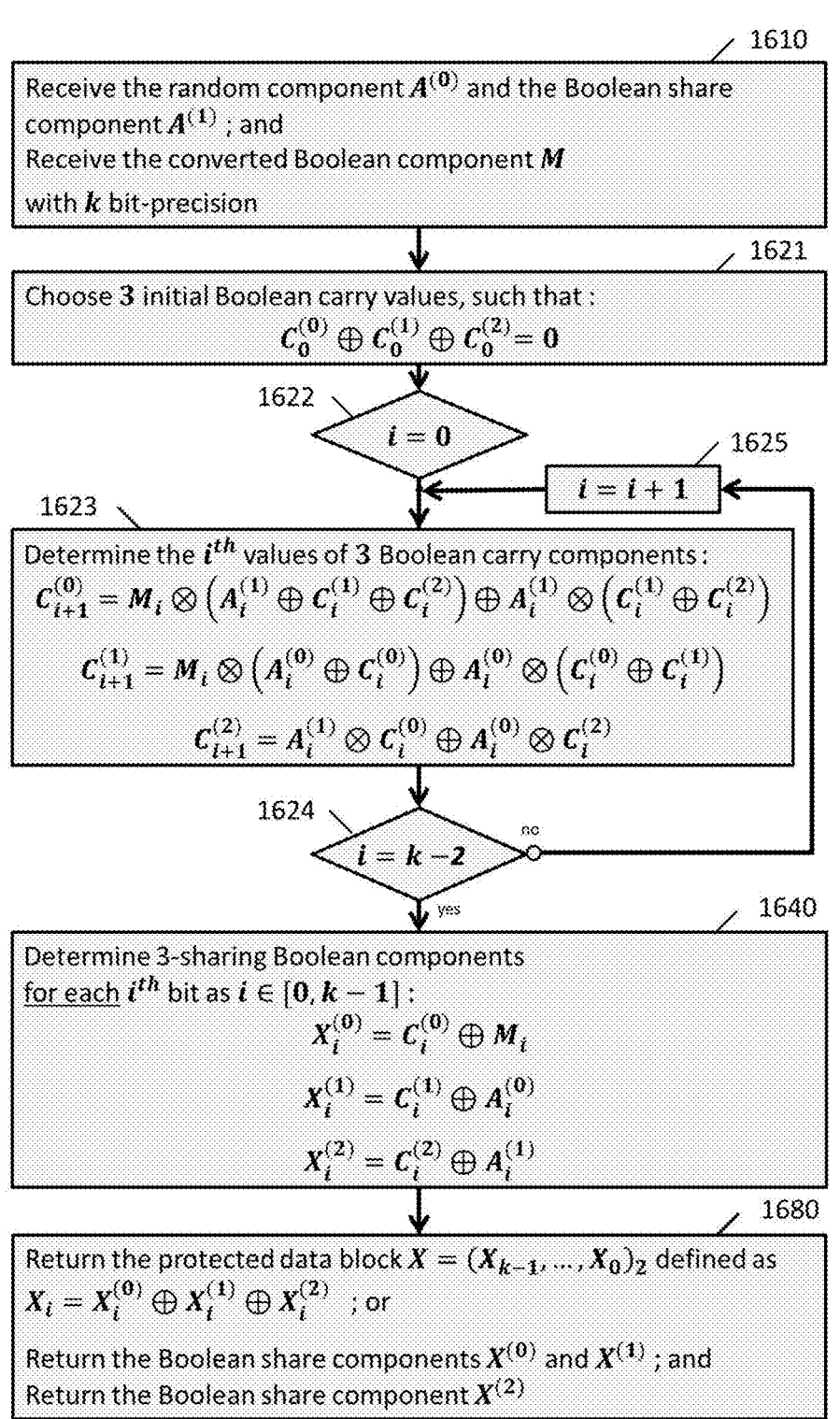

1610

Receive the random component $A^{(0)}$ and the Boolean share component $A^{(1)}$ ; and
Receive the converted Boolean component $M$
with $k$ bit-precision

1621

Choose 3 initial Boolean carry values, such that :
$$C_0^{(0)} \oplus C_0^{(1)} \oplus C_0^{(2)} = 0$$

1622

$$i = 0$$

1625

$$i = i + 1$$

1623

Determine the $i^{th}$ values of 3 Boolean carry components :
$$C_{i+1}^{(0)} = M_i \otimes \left( A_i^{(1)} \oplus C_i^{(1)} \oplus C_i^{(2)} \right) \oplus A_i^{(1)} \otimes \left( C_i^{(1)} \oplus C_i^{(2)} \right)$$
$$C_{i+1}^{(1)} = M_i \otimes \left( A_i^{(0)} \oplus C_i^{(0)} \right) \oplus A_i^{(0)} \otimes \left( C_i^{(0)} \oplus C_i^{(1)} \right)$$
$$C_{i+1}^{(2)} = A_i^{(1)} \otimes C_i^{(0)} \oplus A_i^{(0)} \otimes C_i^{(2)}$$

1624

$$i = k - 2$$        no yes

1640

Determine 3-sharing Boolean components
for each $i^{th}$ bit as $i \in [0, k-1]$ :
$$X_i^{(0)} = C_i^{(0)} \oplus M_i$$
$$X_i^{(1)} = C_i^{(1)} \oplus A_i^{(0)}$$
$$X_i^{(2)} = C_i^{(2)} \oplus A_i^{(1)}$$

1680

Return the protected data block $X = (X_{k-1}, \ldots, X_0)_2$ defined as
$X_i = X_i^{(0)} \oplus X_i^{(1)} \oplus X_i^{(2)}$ ; or Return the Boolean share components $X^{(0)}$ and $X^{(1)}$ ; and
Return the Boolean share component $X^{(2)}$

Fig. 10

METHOD AND SYSTEM FOR PROTECTING CRYPTOGRAPHIC OPERATIONS AGAINST SIDE-CHANNEL ATTACKS

CROSS-REFERENCE TO RELATED APPLICATION

This application claims priority to foreign European patent application No. EP 22305906.4, filed on Jun. 22, 2022, the disclosure of which is incorporated by reference in its entirety.

FIELD OF THE INVENTION

This invention generally relates to cryptographic systems and, more particularly, to cryptographic systems and methods protecting the execution of one or more cryptographic operations related to a cryptographic mechanism against side-channel attacks, based on arithmetic and Boolean sharing functions.

BACKGROUND

Cryptographic systems provide data protection solutions that ensure confidentiality, security, authentication, integrity, and privacy of digital data during its storage in insecure memories and/or transmission over insecure networks.

A cryptographic system (also called a 'cryptosystem') implements a cryptographic algorithm that executes one or more cryptographic operations.

Exemplary cryptographic algorithms include DES (Data Encryption Standard), AES (Advanced Encryption Standard), SHA (Secure Hash Algorithm), public-key algorithms such as the RSA (Rivest, Shamir, & Adleman), as well as cryptographic algorithms used in post-quantum cryptography systems, such as FRODO, CRYSTALS-DILITHIUM or CRYSTALS-KYBER algorithms.

While the security of the implementation of cryptographic algorithms, for example in the form of hardware-based and/or software-based encryption operations executed by a cipher, is of paramount importance, they can be exposed to side-channel attacks. Side-channel attacks exploit the fact that any device performing cryptographic algorithms leaks information directly related to a secret key used for data encryption. The leaked information may be measure through certain physical phenomena such as execution time, power consumption, electromagnetic radiation, etc.

Various countermeasures have been proposed to secure the execution of cryptographic algorithms against side-channel attacks. In one approach, the countermeasures are based on masking methods that randomize all the sensitive data, as described for example in the article "Power analysis attacks—revealing the secrets of smart cards" from S. Mangard et al. 2007, Springer. Such approach consists in concealing every key-dependent intermediate result with a random value (i.e. the so-called mask) in order to break the dependency between the secret key and the leaked information (for example the power consumption).

Logical operations are generally protected using Boolean masking, whereas the protection of additions/subtractions and multiplications uses arithmetic and multiplicative masking, respectively. When a cryptographic algorithm involves a combination of these operations, conversion techniques are used to convert the masks from one form to the other in order to get the correct result.

Arithmetic and Boolean conversion methods from arithmetic and Boolean masks have been proposed in Louis Goubin, "A Sound Method for Switching between Boolean and Arithmetic Masking" in: Koç, Ç. K., Naccache, D., Paar, C. (eds) Cryptographic Hardware and Embedded Systems—CHES 2001, Springer. Arithmetic and Boolean conversions can efficiently be implemented using table-based methods for example. However, such methods do not extend to higher-order security and require workarounds to handle prime moduli which are difficult to translate to a hardware implementation that also resists glitches (also named fault attacks).

There is accordingly a need for improved methods, systems, computer programs capable of efficiently protecting any cryptographic algorithm against side-channel attacks and fault attacks.

SUMMARY OF THE INVENTION

In order to address these and other problems, there is provided a cryptographic system for executing operations of a cryptographic scheme, the operations being applied to a data block u to generate encrypted data corresponding to a protected data block X. The cryptographic system comprises a first sharing processing unit configured to execute an arithmetic sharing function applied to the data block u using at least one secret key, and providing as an output a first arithmetic share component A and a second arithmetic share component M. The cryptographic system further comprises a second sharing processing unit and a computation processing unit. The second sharing processing unit is configured to determine a random component $A^{(0)}$, and further configured to execute a Boolean sharing function applied to the first arithmetic share component A and to said random component $A^{(0)}$ and providing as an output an intermediate Boolean share component $A^{(1)}$. The computation processing unit is configured to execute a recursive carry computation function configured to compute a first Boolean share component $X^{(0)}$, a second Boolean share component $X^{(1)}$ and a third Boolean share component $X^{(2)}$ from the second arithmetic share component M, the random component $A^{(0)}$ and the intermediate Boolean share component $A^{(1)}$.

The protected data block X is generated from the first Boolean share component $X^{(0)}$, the second Boolean share component $X^{(1)}$ and the third Boolean share component $X^{(2)}$.

Advantageously, the intermediate Boolean share component $A^{(1)}$ and the second arithmetic share component M may be associated with said k bit-precision. The computation processing unit may be configured to initialize three carry values $$C_0^{(0)}, C_0^{(1)}, \text{ and } C_0^{(2)}$$

to class zero. The computation processing unit may be further configured to execute the recursive carry computation function by iteratively determining three carry components $$C_{i+1}^{(0)}, C_{i+1}^{(1)}, \text{ and } C_{i+1}^{(2)}$$

for each index i, initially set to 0, until i=k−2, the index i being incremented for each next iteration, the three carry components $$C_{i+1}^{(0)}, C_{i+1}^{(1)}, \text{ and } C_{i+1}^{(2)}$$

at a current iteration corresponding to an index i being determined according to the following equations:

$$-C_{i+1}^{(0)} = M_i \otimes \left(A_i^{(1)} \oplus C_i^{(1)} \oplus C_i^{(2)}\right) \oplus A_i^{(1)} \otimes \left(C_i^{(1)} \oplus C_i^{(2)}\right);$$

$$-C_{i+1}^{(1)} = M_i \otimes \left(A_i^{(0)} \oplus C_i^{(0)}\right) \oplus A_i^{(0)} \otimes \left(C_i^{(0)} \oplus C_i^{(1)}\right);$$

$$-C_{i+1}^{(2)} = A_i^{(1)} \otimes C_i^{(0)} \oplus A_i^{(0)} \otimes C_i^{(2)}.$$

The computation processing unit may be configured to determine the 3-sharing Boolean components $$X_i^{(0)}, X_i^{(1)} \text{ and } X_i^{(2)}$$

corresponding to each index i comprised between 0 and k according to the following equations:

$$-X_i^{(0)} = C_i^{(0)} \oplus M_i;$$

$$-X_i^{(1)} = C_i^{(1)} \oplus A_i^{(0)};$$

$$-X_i^{(2)} = C_i^{(2)} \oplus A_i^{(1)}.$$

In certain embodiments, the Boolean sharing function may be executed for each $i^{th}$ bit corresponding to an index $i \in [0, k-1]$ according to the following equation:

$$A_i^{(1)} = A_i^{(0)} \oplus A_i.$$

The cryptographic scheme may be a lattice-based cryptography scheme.

The random component $A^{(0)}$ may be determined with a bit-precision value k. The cryptographic system may further comprise an additional computation processing unit configured to determine an optimum coefficient value $$Q_k^{-1}$$

from an initial coefficient value Q chosen from prime numbers, and to provide the bit-precision value k.

The additional computation processing unit may be configured to initially set an initial value $k_m$ of said bit-precision value k to $\lceil \log_2 Q \rceil$ and determine a critical value s as $$s = \left\lfloor \frac{Q}{2} \right\rfloor.$$

The additional computation processing unit may further be configured to determine said optimum coefficient value $Q_k^{-1}$ by iteratively computing, for each value k, k being initially set to $k_m$ and being incremented for each next iteration:

a coefficient value $Q_k^{-1}$ corresponding to the current value of k according as $$\left\lfloor \frac{2^k}{Q} \right\rfloor,$$

two intermediate comparison values $$t_1 = s \times Q_k^{-1} \text{ and } t_2 = (s+1) \times Q_k^{-1}.$$

The iterations may be terminated if $t_1 < 2^{k-1}$ and $t_2 \geq 2^{k-1}$, and the coefficient value $$Q_k^{-1}$$

and the bit-precision value k may correspond to the last iteration being returned by the additional computation processing unit.

In certain embodiments, the cryptographic system may further comprise two converting processing units configured to multiply respectively each of the two arithmetic share components A and M by said optimum coefficient value $$Q_k^{-1}.$$

One of the converting processing unit may be further configured to apply a [q/4] offset to the first arithmetic share component A.

The cryptographic system may further comprises a first evaluation processing unit and a second evaluation processing unit. The first evaluation processing unit may be configured to determine a first final boolean share component B comprising a set of elements $B_i$, $i \in [0, k-1]$, each component $B_i$ being determined as $B_i =$ $$X_i^{(0)} \oplus X_i^{(1)}.$$

The second evaluation processing unit may be configured to determine a second final boolean share component N comprising a set of elements $N_i$, $i \in [0, k]$, each component $N_i$ being determined equal to said third Boolean share component; The first and second evaluation processing units may be configured to return the $k^{th}$ elements $B_{k-1}$ and $N_{k-1}$ of the first final boolean share component and of the first final boolean share component.

The second sharing processing unit and the computation processing unit may comprise electronic circuits comprising electronic logic gate.

There is further provided a method of executing operations of a cryptographic scheme, the method comprising the step of executing an arithmetic sharing function applied to a data block u and providing as an output a first arithmetic share component A and a second arithmetic share component M. The method comprises the steps of:

determining a random component $A^{(0)}$ with a bit-precision value k, and executing a Boolean sharing function to the first arithmetic share component A and to said random component $A^{(0)}$ and providing as an output an intermediate Boolean share component $A^{(1)}$, executing a recursive carry computation configured to compute a first Boolean share component $X^{(0)}$, a second Boolean share component $X^{(1)}$ and a third Boolean share component $X^{(2)}$ from the second arithmetic share component M, the random component $A^{(0)}$ and the intermediate Boolean share component $A^{(1)}$.

The intermediate Boolean share $A^{(1)}$ and the second arithmetic share component M may be associated to said k bit-precision. The method may comprise the step of initializing to class zero three carry values $$C_0^{(0)}, C_0^{(1)}, \text{ and } C_0^{(2)}.$$

The recursive carry computation may comprise the step of iteratively determining three carry components $$C_{i+1}^{(0)}, C_{i+1}^{(1)}, \text{ and } C_{i+1}^{(2)}$$

for each index i, initially set to 0, until i=k−2, the index i being incremented for each next iteration, the three carry components $$C_{i+1}^{(0)}, C_{i+1}^{(1)}, \text{ and } C_{i+1}^{(2)}$$

at a current iteration corresponding to an index i being determined according to:

$$C_{i+1}^{(0)} = M_i \otimes \left(A_i^{(1)} \oplus C_i^{(1)} \oplus C_i^{(2)}\right) \oplus A_i^{(1)} \otimes \left(C_i^{(1)} \oplus C_i^{(2)}\right);$$

$$C_{i+1}^{(1)} = M_i \otimes \left(A_i^{(0)} \oplus C_i^{(0)}\right) \oplus A_i^{(0)} \otimes \left(C_i^{(0)} \oplus C_i^{(1)}\right);$$

$$C_{i+1}^{(2)} = A_i^{(1)} \otimes C_i^{(0)} \oplus A_i^{(0)} \otimes C_i^{(2)}.$$

The method may comprise the step of determining the 3-sharing boolean components $$X_i^{(0)}, X_i^{(1)} \text{ and } X_i^{(2)}$$

corresponding to each index i comprised between 0 and k according to:

$$X_i^{(0)} = C_i^{(0)} \oplus M_i;$$

$$X_i^{(1)} = C_i^{(1)} \oplus A_i^{(0)};$$

$$X_i^{(2)} = C_i^{(2)} \oplus A_i^{(1)}.$$

The Boolean sharing function may comprise the step of executing for each $i^{th}$ bit corresponding to an index $i \in [0, k-1]$ according to the following equation $$A_i^{(1)} = A_i^{(0)} \oplus A_i.$$

Embodiments of the invention therefore provide masked implementations of an arithmetic and Boolean conversion method that are based on secure efficient implementation of a ripple-carry adder over arithmetic and Boolean share components. Advantageously, such embodiments are extensible to higher-order security.

Further advantages of the present invention will become clear to the skilled person upon examination of the drawings and detailed description. It is intended that any additional advantages be incorporated herein.

BRIEF DESCRIPTION OF DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 9 is a flowchart depicting the steps performed for executing a Boolean sharing function, according to some embodiments.

FIG. 10 is a flowchart depicting the steps performed for a recursive carry computation, according to certain embodiments.

Identical references are used in the figures to designate identical or similar elements. For clarity, items shown are not to scale.

DETAILED DESCRIPTION

Figure 1:
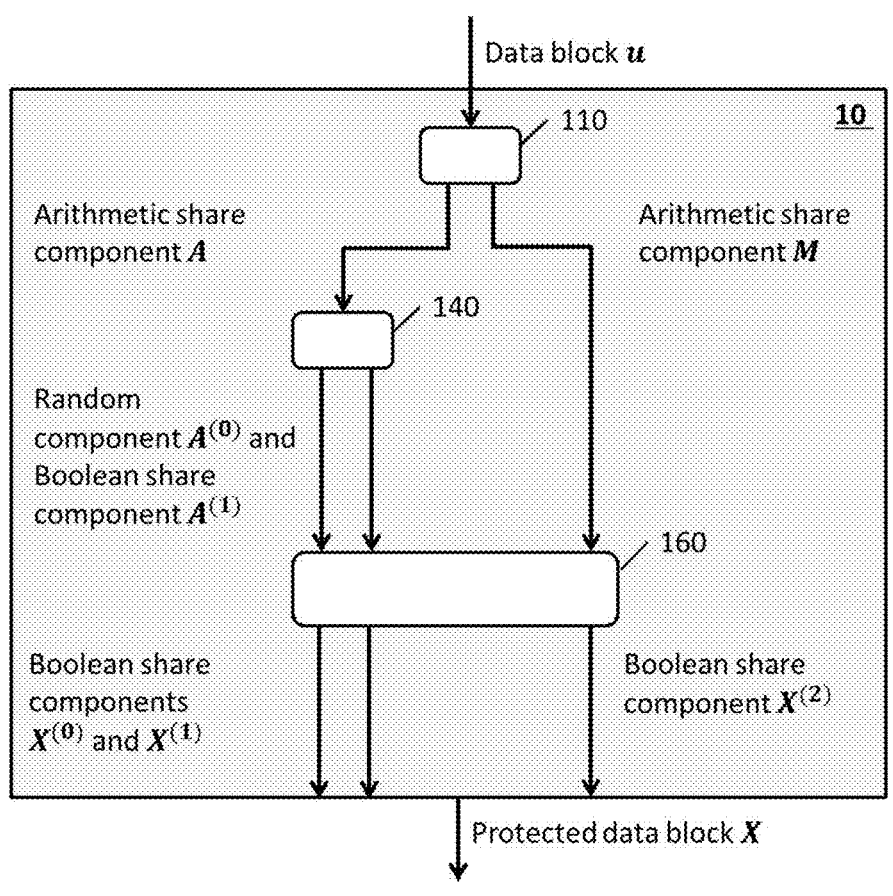
FIG. 1 illustrates a cryptographic system implementing a cryptographic scheme, according to some embodiments.

FIG. 1 shows a cryptographic system ("cryptosystem") 10, implementing one or more cryptographic schemes (or mechanisms) to ensure security, authentication, protection and privacy of data during the storage and/or the transmission of the data.

The cryptographic schemes may employ one or more cryptographic keys S in order to generate encrypted data corresponding to a protected data block X from original data corresponding to an original data block u to prevent an attacker from recovering these original data. To recover the original data from the encrypted data through decryption mechanisms, during a decryption phase, the cryptographic system 10 may access to the cryptographic keys which were used to encrypt the original data.

The cryptographic system 10 is configured to execute the cryptographic operations of the cryptographic scheme applied to the data block u. The data block u is a $k_0$-bit word of incoming initial data that are to be encrypted.

The cryptographic system 10 may be for example a cryptographic system which implements cryptographic schemes for public key encryption/decryption. However, the invention is not limited to such application of the invention to key encryption/decryption and may be applied to other security related applications, such as digital signatures generation and verification.

The cryptographic system 10 may comprise a plurality of processing units configured to execute the cryptographic operations related to the cryptographic schemes while protecting such execution from attacks, using hiding method and/or masking method.

The cryptographic system 10 executes at least one cryptographic algorithm implementing one or more cryptographic operations and defining the cryptographic scheme.

A cryptographic algorithm may be any cryptographic algorithm comprising (or implementing) Boolean operations (i.e. logic operations) and/or arithmetic operations, such as conventional or post-quantum cryptographic algorithms. For example and without limitations, the cryptographic algorithm may be the IDEA, RC5, RSA and SHA, or lattice based cryptographic algorithms as FRODO, CRYSTALS-DILITHIUM or CRYSTALS-KYBER algorithm.

As shown in FIG. 1, the processing units of cryptographic system 10 may comprise a first sharing processing unit 110, a second sharing processing unit 140 and a computation processing unit 160.

The first sharing processing unit 110 is configured to execute an arithmetic sharing function applied to the data block u which provides a first arithmetic share component A and a second arithmetic share component M.

According to some embodiments, the first sharing processing unit 110 may use two secret keys, namely $S_A$ and $S_M$, obtained for example from a unique secret key S, initially generated as having any bit size for example. The secret keys may be stored in a key storage unit (not shown on the figures) comprised in the first sharing processing unit 110 (or else anywhere in the cryptosystem 10).

In other terms, the first sharing processing unit 110 may be configured to execute the arithmetic sharing function applied to the data block u using a first key share $S_A$ and a second key share $S_M$, both key shares being determine from one secret key S, and providing as an output a first arithmetic share component A from the first key share $S_A$ and a second arithmetic share component M from the second key share $S_M$.

For example, the unique secret key S can be divided (i.e. shared or partitioned) in two or more secret keys (i.e. also called 'secret key shares' or 'key shares'). The key shares can be arithmetic key shares or can be the result from one or more Boolean sharings of arithmetic key share(s).

The arithmetic sharing function comprises at least two modular operations, each being executed in at least one group modulo a given modulus between the data block u and one scalar.

The scalars for the two modular operations are different. Each scalar may be one of the secret keys $S_A$ and $S_M$.

As used herein, an operation defined "modulo a given modulus q" (or "modular operation") refers to an operation for which the remainder of the Euclidean Division of the operation result by the modulus q is determined such that the final operation result of the modular operation belongs to [0; q−1].

A modular operation refers to an operation for which the reduction modulo the number of elements of the group allows to keep the intermediate data within a predefined range, namely between zero and the number of elements in a group, minus one. Therefore, the bit width of all values may be predetermined, which contributes in a significant speed up of the computations. Thus, the bit width corresponds to the initial $k_0$ bit-precision value and may be an intrinsic value to the first sharing processing unit 110.

A "group" (for example "integers" noted $\mathbb{Z}$ in mathematical notations) refers to an algebraic structure consisting of a set of elements (namely operands) and having an internal law defining a basis operation that combines any two operands to form a third operand. For example, the basis operation may be an addition operation defined by the group internal law "+" (additive operator), or a multiplication operation defined by the group internal law "×" (multiplicative operator). Advantageously, the group can be one particular operation of a larger algebraic structure, such as a ring or a field, typically used in cryptographic operation.

In one embodiment, the second sharing processing unit 140 is configured to execute a Boolean sharing function applied to the first arithmetic share component A as shown in FIG. 1, which provides a Boolean share component $A^{(1)}$ (also called "intermediate Boolean share component" $A^{(1)}$). Such Boolean sharing function may comprise a logic operation between two operands, one of the operand corresponding to the first arithmetic share component A and the other operand corresponding to a random component $A^{(0)}$, the random component $A^{(0)}$ being an Boolean component.

In another embodiment, the second sharing processing unit 140 is configured to execute a Boolean sharing function applied to the second arithmetic share component M which provides an intermediate Boolean share component $M^{(1)}$. For simplification and illustration purpose only, the following description will be extended to the Boolean sharing function applied to the first arithmetic share component A. However, the skilled person will readily understand that the equivalent process applies to the second arithmetic share component M.

According to some embodiments, the second sharing processing unit 140 may comprise a random generation unit (not shown on the figures) configured to generate the random component $A^{(0)}$ with a determined k bit-precision. The determined k bit-precision value may be the initial $k_0$ bit-precision value, and thereby an intrinsic value to the second sharing processing unit 140. Alternatively, the determined k bit-precision value may be defined by an additional computation processing unit 120 from the initial $k_0$ bit-precision value among others parameters.

In one embodiment, the random component $A^{(0)}$ and the first arithmetic share component A may be two integers defined as k-bit integers, represented as a string of k bits, and defined according to the following expressions:

$$A^{(0)} = \left( A^{(0)}_{k-1}, \dots, A^{(0)}_0 \right)_2 \tag{1}$$

$$A = (A_{k-1}, \dots, A_0)_2 \tag{2}$$

It should be noted that, for simplification and illustration purpose only, the first arithmetic share component A and the second arithmetic share component M will be expressed hereinafter as integers defined as k-bit integers, represented as a string of k bits. The second arithmetic share component M will be therefore defined by the following expression (3):

$$M = (M_{k-1}, \ldots, M_0)_2 \qquad (3)$$

However, the skilled person will readily understand that the determined k bit-precision value may be the initial $k_0$ bit-precision value if not previously defined by an additional computation processing unit 120.

Figure 5:
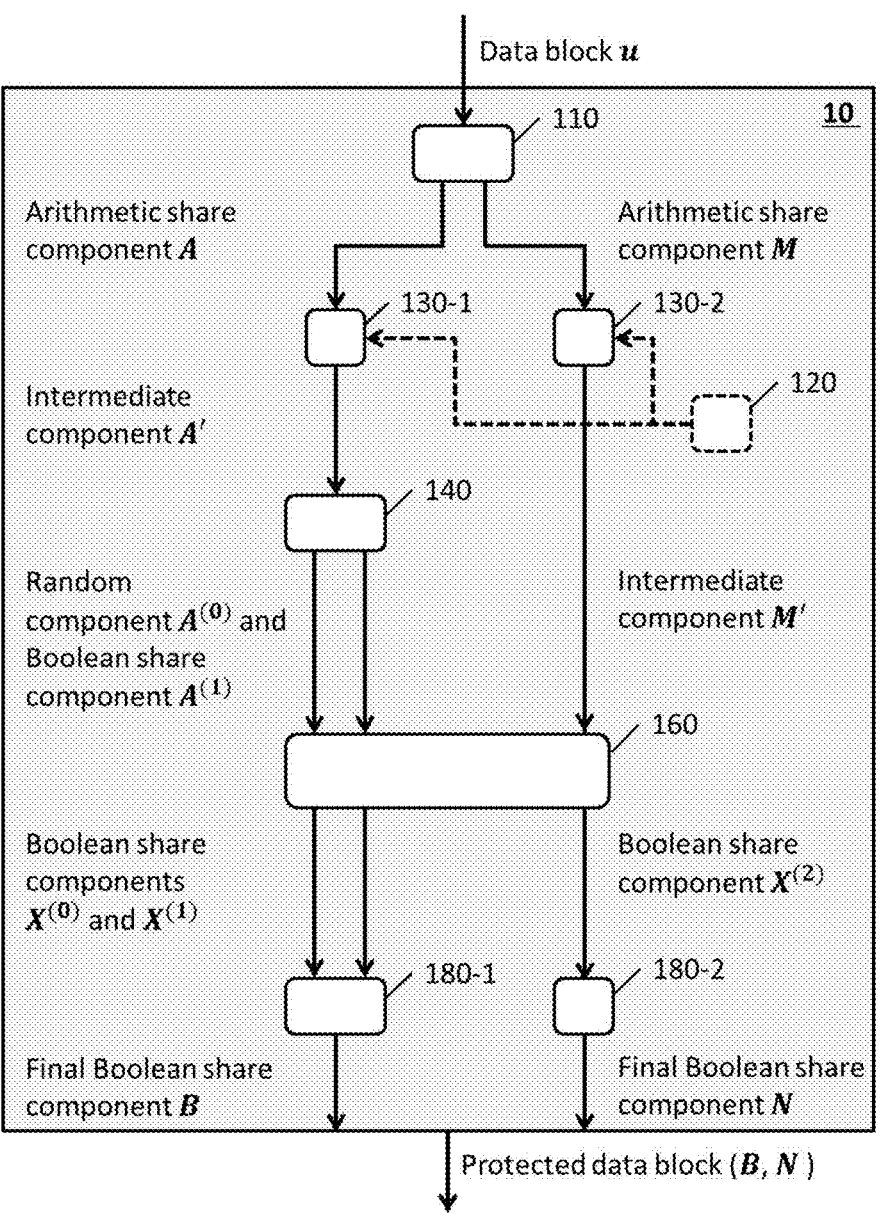
FIG. 5 illustrates a cryptographic system implementing a cryptographic scheme for lattice-based cryptography, according to certain embodiments.

Alternatively, if the k bit-precision value (from the initial $k_0$ bit-precision) is determined by the additional computation processing unit 120, the processing units of the cryptographic system may comprise two converting processing units 130-1 and 130-2 configured to determine the first arithmetic share component A and the second arithmetic share component M respectively, according to the expressions (2) and (3), as integers defined as $k_0$-bit integers. The two converting processing units 130-1 and 130-2 may be arranged at the output of the first sharing processing unit 110 for example and as represented in FIG. 5.

Figure 2:
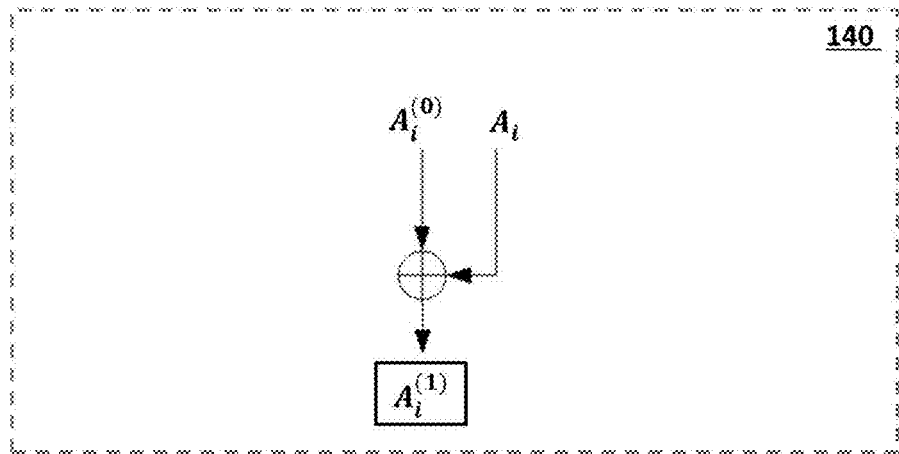
FIG. 2 illustrates an electronic circuit executing a logical operation, according to certain embodiments.

As represented in FIG. 2, in some embodiments, the second sharing processing unit 140 may be implemented as an electronic circuit executing a logical operation. For example, the Boolean sharing function may be a logical XOR operation (denoted by the "⊕" symbol) performed in a bitwise fashion, i.e. for each $i^{th}$ bit defined as $i \in [0, k-1]$, according to the following equation:

$$A_i^{(1)} = A_i^{(0)} \oplus A_i \qquad (4)$$

The skilled person will readily understand that such Boolean sharing function, executed by the second sharing processing unit 140, allows the sharing of the first arithmetic share component A into the two shares, which are the random Boolean component $A^0$ and the intermediate Boolean share component $A^{(1)}$.

The cryptographic system 10 further comprises a computation processing unit 160 configured to execute a recursive carry computation (also called recursive carry function) providing a first Boolean share component $X^{(0)}$, a second Boolean share component $X^{(1)}$ and a third Boolean share component $X^{(2)}$.

The recursive carry computation refers to the computation of three carry components $C^{(0)}$, $C^{(1)}$, and $C^{(2)}$ which may be integers defined as (k+1)-bit integers, represented as a string of (k+1) bits, as given by the following expression (5):

$$C^{(j)} = \left( C_k^{(j)}, \ldots, C_0^{(j)} \right)_2 \text{ as } j \in [0, 2] \qquad (5)$$

Alternatively, the three carry components $C^{(0)}$, $C^{(1)}$, and $C^{(2)}$ may be integers defined as k-bit integers, represented as a string of k bits, as given by the following expression (5'):

$$C^{(j)} = \left( C_{k-1}^{(j)}, \ldots, C_0^{(j)} \right)_2 \text{ as } j \in [0, 2] \qquad (5')$$

According to some embodiments, the computation processing unit 160 may comprise a initialization unit (not shown on the figures) containing a zero-initialization (i.e. initialization to class zero) of three carry values $$C_0^{(0)}, C_0^{(1)}, \text{ and } C_0^{(2)},$$

such that:

$$C_0^{(0)} \oplus C_0^{(1)} \oplus C_0^{(2)} = 0 \qquad (6)$$

The recursive carry computation may further comprise a number of logic operations to generate each $(i+1)^{th}$ bit of three carry components $C^{(0)}$, $C^{(1)}$, and $C^{(2)}$ (as $i \in [0, k-1]$), from the i bit of the random component $A^{(0)}$, the i bit of the first arithmetic share component A, the i bit of the second arithmetic share component M and the i bit of said three carry components $C^{(0)}$, $C^{(1)}$, and $C^{(2)}$. Such recursive carry computation requires a k clock cycles to perform a complete computation.

Figure 3:
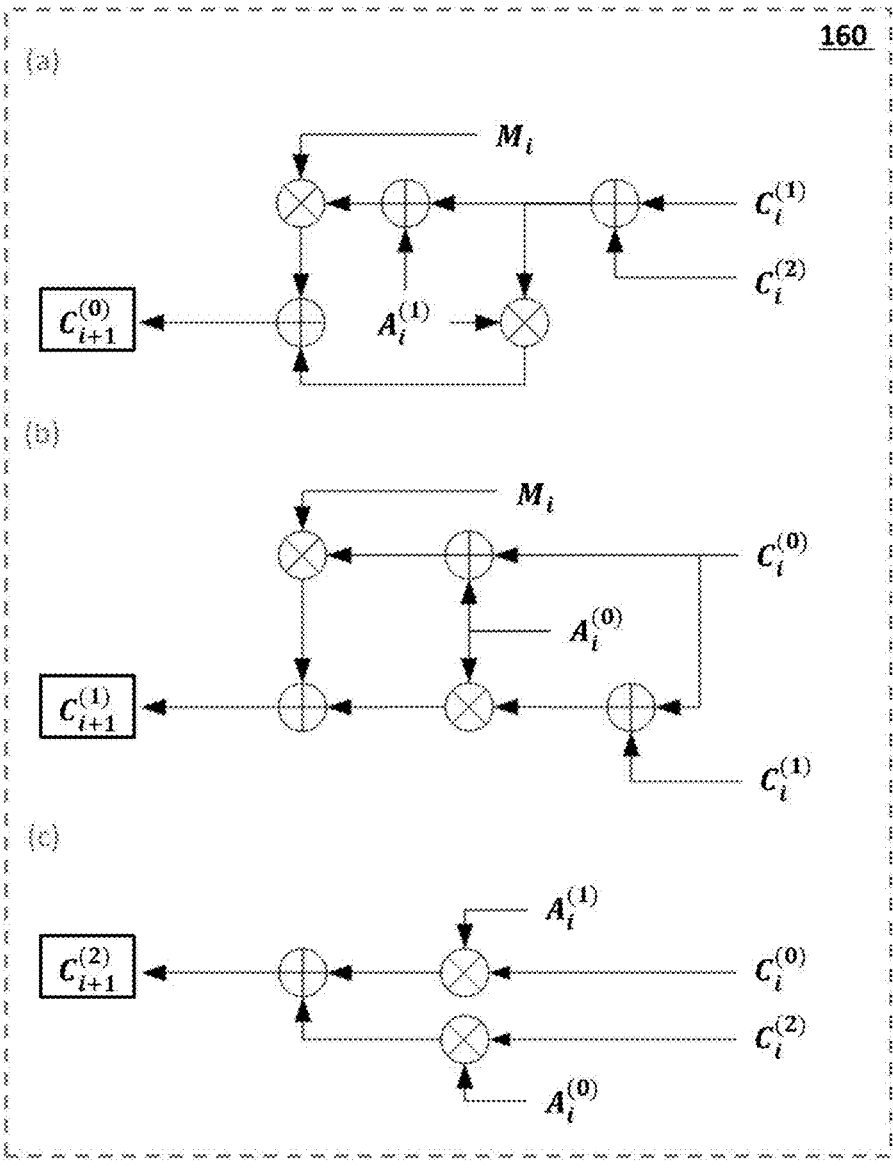
FIG. 3 illustrates electronic circuits executing logical operations, according to some embodiments.

FIG. 3 illustrates an embodiment of the present invention, wherein the second sharing processing unit 140 may be implemented as three intertwine electronic circuits executing logical operations (i.e. gates). For example, the recursive carry computation may refers to logical XOR operations and logical AND operations (denoted by the "⊗" symbol) performed in a bitwise fashion, for each consecutive clock cycles defined by i, in a recursive manner from i=0 until i=k−1, according to the following equations (7), (8) and (9):

$$C_{i+1}^{(0)} = M_i \otimes \left( A_i^{(1)} \oplus C_i^{(1)} \oplus C_i^{(2)} \right) \oplus A_i^{(1)} \otimes \left( C_i^{(1)} \oplus C_i^{(2)} \right) \qquad (7)$$

$$C_{i+1}^{(1)} = M_i \otimes \left( A_i^{(0)} \oplus C_i^{(0)} \right) \oplus A_i^{(0)} \otimes \left( C_i^{(0)} \oplus C_i^{(1)} \right) \qquad (8)$$

$$C_{i+1}^{(2)} = A_i^{(1)} \otimes C_i^{(0)} \oplus A_i^{(0)} \otimes C_i^{(2)} \qquad (9)$$

Alternatively, the recursive carry computation may be performed in a bitwise fashion according to the following equations (7), (8) and (9), for each consecutive clock cycles defined by i, in a recursive manner from i=0 until i=k−2. Such embodiment applies if the $k-1^{th}$ elements $$C_k^{(0)}, C_k^{(1)}, \text{ and } C_k^{(2)}$$

of each of the three carry components is not used.

According to some embodiments, the computation processing unit 160 may comprise three carry registers configured to store the three carry components $C^{(0)}$, $C^{(1)}$, and $C^{(2)}$ and which may be initialized, for instance with a k-bit set of zero values. The computation processing unit 160 may further comprise shift registers to store the three operands M, $A^{(0)}$ and $A^{(1)}$, for example to synchronize every consecutive clock cycle.

The recursive carry computation further refers to the determination of three resulting Boolean share components $X^{(0)}$, $X^{(1)}$ and $X^{(2)}$. These components may be integers defined as k-bit integers, represented as a string of k bits, as given by the following expression (10):

$$X^{(j)} = \left( X_{k-1}^{(j)}, \ldots, X_0^{(j)} \right)_2 \qquad (10)$$

$$\text{as } j \in [0, 2]$$

Figure 4:
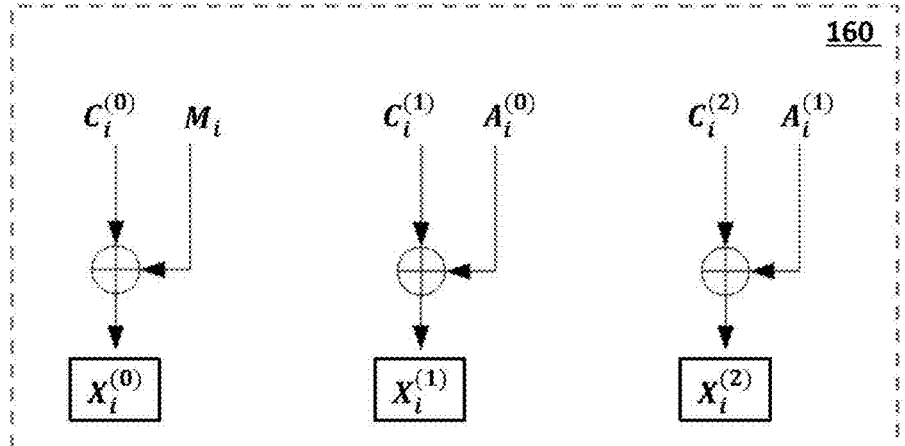
FIG. 4 illustrates other electronic circuits executing logical operations, according to alternative embodiments.

As represented in FIG. 4, the computation processing unit 160 may execute additional Boolean sharing operations corresponding to logical XOR operations performed in a bitwise fashion, i.e. for each $i^{th}$ bit defined as $i \in [0, k-1]$ according to the following equations:

$$X_i^{(0)} = C_i^{(0)} \oplus M_i \tag{11}$$

$$X_i^{(1)} = C_i^{(1)} \oplus A_i^{(0)} \tag{12}$$

$$X_i^{(2)} = C_i^{(2)} \oplus A_i^{(1)} \tag{13}$$

The cryptographic system 10 according to the embodiments of the invention uses the first sharing processing unit 110, the second sharing processing unit 140 and the computation processing unit 160 to enable the implementation of a secure and efficient arithmetic adder for Boolean-masked values. In particular, the computation processing unit 160 is defined by an architecture based on the ripple-carry adder that targets low-cost applications and high-performance applications since it is optimized in terms of number of logic gates.

Furthermore, the cryptographic system 10 according to the embodiments of the invention provide implementations that comply with the threshold implementation approach, defined by Nikova et al in the article "Threshold Implementations Against Side-Channel Attacks and Glitches" in: Ning, P., Qing, S., Li, N. (eds) Information and Communications Security. ICICS 2006, Springer, to improve the resistance against side-channel attacks even in the presence of glitches (causing valuable information leakage). Such implementations meet the three threshold implementation properties including the 'Correctness' property (i.e. the sum of the result should be the expected one), the 'Non-Completeness' property (i.e. each gate should be independent at least from one share) and the 'Uniformity' property (i.e. the distribution of the shares is uniform). It should be noted that, as the recursive carry computation is performed in a bitwise fashion according to equations (7), (8) and (9), each $i^{th}$ bit of the three carry components $C^{(0)}$, $C^{(1)}$, and $C^{(2)}$ may be registered to pipeline, which enables stopping the possible propagation of instable combinatorial signals defined here as specific logical XOR operations and/or logical AND operations improper to the threshold implementation approach. Furthermore, like the three shares M, $A^{(0)}$ and $A^{(1)}$ of the recursive carry computation are designed by the embodiments of the invention, advantageously, the XOR operations of the three operands M, $A^{(0)}$ and $A^{(1)}$ do not leak any secret value of the protected data block X.

In some embodiments, the cryptographic system 10 may be a post-quantum cryptography system, using for example a lattice based cryptographic algorithm. The cryptographic system 10 may be configured to apply (a) a polynomial multiplication operation (denoted by the "$\odot$" symbol), (b) a subtraction operation and (c) a rounded division operation over the polynomial ring $\mathbb{Z}_q[X]$, with q being a prime number:

$$m^a \leftarrow (S \odot u) \bmod q \tag{a}$$

$$m^b \leftarrow (v - m^a) \bmod q \tag{b}$$

$$m^c \leftarrow \left\lfloor \frac{2 \times m^b}{q} \right\rceil \bmod 2 \tag{c}$$

In an embodiment, a latter based cryptographic algorithm may be a CRYSTALS-KYBER cryptographic algorithm such as q=3329 which is a prime number.

The first sharing processing unit 110 may be configured to execute an arithmetic sharing function using the polynomial multiplication operation of equation (a), and using two operands (the data block u and the secret key $S_A$, or correspondingly u and $S_M$) to form the third operand (the first arithmetic share component A, or correspondingly M), according to equations (14) and (15):

$$A = (S_A \odot u) \bmod q \tag{14}$$

$$M = (S_M \odot u) \bmod q \tag{15}$$

As a result, the arithmetic sharing function result may be expressed as follows:

$$m^b = (A + M) \bmod q \tag{b'}$$

Therefore, according to some embodiments, the protected data block X may be expressed as follows:

$$X = ((A^{(0)} \oplus A^{(1)}) + M) \bmod q \tag{16}$$

In one embodiment, the protected data block X is represented as a string of k bits and defined according to the following expression (17):

$$X = (X_{k-1}, \ldots, X_0)_2 \tag{17}$$

Therefore, as the k bits may not be impacted by the modular reduction expressed in equation (16), for each $i^{th}$ bit defined as $i \in [0, k-1]$, the $X_i$ elements may be expressed as follows:

$$X_i = \left(A_i^{(0)} \oplus A_i^{(1)}\right) \oplus M_i \oplus C_i \tag{18}$$

In equation (18), a $C_i$ element is the $i^{th}$ bit of an overall carry component C which is determined from the three carry components $C^{(0)}$, $C^{(1)}$, and $C^{(2)}$. The $C_i$ element is independent from the secret value $X_i$ since the $i^{th}$ bits $C_i^{(0)}$, $C_i^{(1)}$, and $C_i^{(2)}$ are computed from previous $i-1^{th}$ bits according to the equations (7), (8) and (9). Therefore, in equation (18), any $C_i$ element may have the role of a 'mask' to determine the protected data block X.

To determine the result of the rounded division operation, a non-limiting example of equation (c) of lattice based cryptography algorithms, three boundaries may be taken into account, according to equations (19) and (20):

$$0 \leq A \leq q-1 \text{ and } 0 \leq M \leq q-1 \tag{19}$$

$$0 \leq A + M \leq 2(q-1) \tag{20}$$

FIG. 5 illustrates an embodiment of the present invention, wherein the cryptographic system 10 is configured to compute in a secure manner a rounded division operation used in a lattice-based cryptography scheme.

In the embodiment of FIG. 5, the cryptographic system 10 comprises an additional computation processing unit 120, two converting processing units 130-1 and 130-2, and two evaluation processing unit 180-1 and 180-2, in addition to the processing units represented in FIG. 1.

To implement the rounded division operation from equation (c), in some embodiments, the additional computation processing unit 120 may be configured to generate an optimum coefficient value $Q_k^{-1}$ based on an initial coefficient value Q, and to provide the value k of the k bit-precision.

According to some embodiments, the additional computation processing unit 120 may comprise an initialization unit (not shown on the figures) comprising the initial coefficient value Q which may be chosen from integers modulo the given modulus q and/or may be equal to the modulus q value.

The additional computation processing unit 120 may be configured to first determine a value $k_m$ according to the following equation (21):

$$k_m \leftarrow \lceil \log_2 Q \rceil \qquad (21)$$

The value $k_m$ corresponds to a minimal possible value of the k bit-precision function of the initial coefficient value Q. As a result, the minimal bit-precision $k_m$ may be equivalent to the initial $k_0$ bit-precision value.

The additional computation processing unit 120 may then be configured to determine a critical value, noted s, according to equation (22):

$$s = \left\lfloor \frac{Q}{2} \right\rfloor \qquad (22)$$

The generation of the optimum coefficient value $Q_k^{-1}$ may be implemented iteratively, starting with an initial k bit-precision equals to the minimal possible value $k_m$. Each iteration comprises an execution of the function (23) to determine $Q_k^{-1}$ from the current value of k, and a determination of intermediate comparison values $t_1$ and $t_2$ according to equations (24) and (25) from the critical value s and the determined value of $$Q_k^{-1}:$$

$$Q_k^{-1} \leftarrow \left\lfloor \frac{2^k}{Q} \right\rfloor; \qquad (23)$$

$$t_1 = s \times Q_k^{-1} \qquad (24)$$

$$t_2 = (s+1) \times Q_k^{-1} \qquad (25)$$

The iterative computation may proceed in an iterative manner, until the conditions (26) and (27) are both satisfied:

$$t_1 < 2^{k-1} \qquad (26)$$

$$t_2 \geq 2^{k-1} \qquad (27)$$

In response to the conditions (26) and (27) being satisfied, the additional computation processing unit 120 may return the corresponding optimum coefficient value $Q_k^{-1}$ and the value k obtained from the final loop of the iterative computation.

According to some embodiments, for the round division, as the division by Q is performed with the multiplication operation by two, a $$\left\lfloor \frac{q}{4} \right\rfloor\text{-shift}$$

may be implemented by the lattice-based cryptography scheme to use the optimum coefficient value $$Q_k^{-1}.$$

This shift may be applied to only one of the two arithmetic share components, for example, the first arithmetic share component A.

Therefore, to implement the rounded division operation from equation (c), according to some embodiments, one of the two converting processing units (130-1 for example) may be configured to first apply an offset to one of the arithmetic share component, as given by the following equation (28):

$$A = \left[ A + \frac{q}{4} \right] \bmod q \qquad (28)$$

The two converting processing units 130-1 and 130-2 may be then configured to multiply respectively each of the two arithmetic share components A and M by the optimum coefficient value $$Q_k^{-1},$$

according to equation (29) and (30):

$$A' = A \times Q_k^{-1} \qquad (29)$$

$$M' = M \times Q_k^{-1} \qquad (30)$$

In equation (29), the first arithmetic share component A is given by equation (28).

It should be noted that, for such embodiments, the arithmetic share components A and M, used in equations (29) and (30), may be each expressed as an integer defined as $k_0$-bit integers, while the arithmetic multiplication operations allow the components A' and M' (called 'intermediate components' A' and M') to be each expressed as an integer defined as k-bit integers, represented as a string of k bits. Therefore, as shown in FIG. 5, and as the skilled person will readily understand, the intermediate components A' and M' may be used by respectively the second sharing processing unit 140 and the computation processing unit 160, similarly as the arithmetic share components A and M.

The result of the rounded division operation can be retrieved from the three resulting Boolean share components $X^{(0)}$, $X^{(1)}$ and $X^{(2)}$ generated by the computation processing unit 160. To implement the rounded division operation from equation (c), according to some embodiments, the cryptographic system 10 may comprise a first evaluation processing unit 180-1 configured to execute a logical XOR operation performed in a bitwise fashion, to determine a first final boolean share component B. The first evaluation processing unit 180-1 may comprise an electronic circuit implementation using two resulting Boolean share components (for example $X^{(0)}$ and $X^{(1)}$) to determine the first final boolean share component B comprising a set of elements $B_i$, $i \in [0, k-1]$. In one embodiment, each element $B_i$ may be determined by the following equation:

$$B_i = X_i^{(0)} \oplus X_i^{(1)} \qquad (31)$$

In such embodiments, the cryptographic system 10 may comprise a second evaluation processing unit 180-2 configured to determine a second final boolean share component N comprising a set of elements $N_i$, $i \in [0, k-1]$. In one embodiment, each element $N_i$ may be defined by the third Boolean share component such as:

$$N_i = X_i^{(2)} \tag{32}$$

The first and second evaluation processing units 180-1 and 180-2 may be then configured to determine (for example to extract) the last $k^{th}$ bits, noted $B_{k-1}$ and $N_{k-1}$, respectively from the first final boolean share component B and the second final boolean share component N, consequently giving the result of the rounded division operation.

Figure 6:
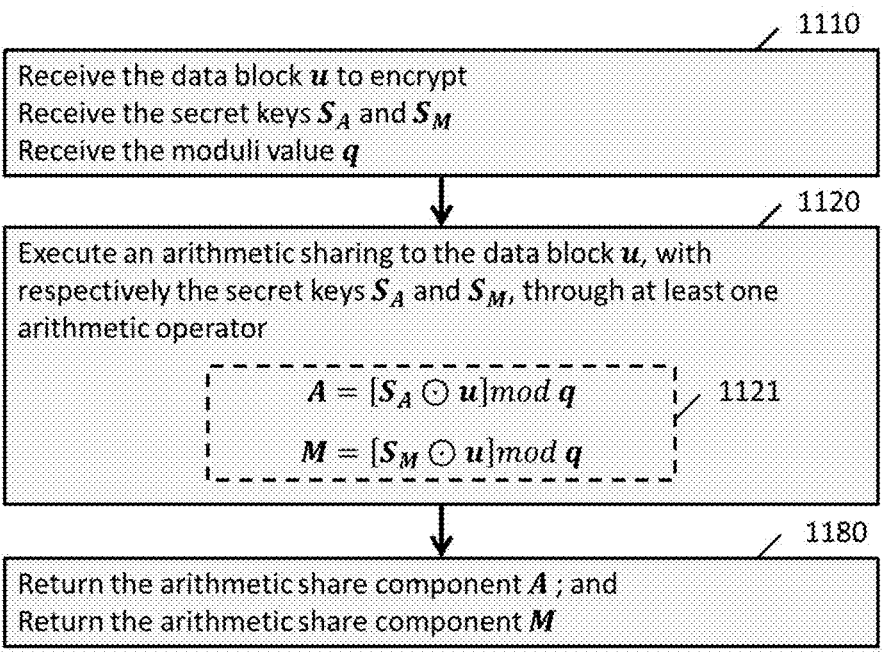
FIG. 6 is a flowchart depicting the steps performed for executing the arithmetic sharing function, according to certain embodiments.

FIG. 6 is a flowchart depicting the steps performed by the first sharing processing unit 110 to execute the arithmetic sharing function, according to certain embodiments.

In step 1110, the data block u, the secret keys $S_A$ and $S_M$, and the modulus q are received.

In step 1120, the arithmetic sharing function is applied to the data block u, using respectively the secret keys $S_A$ and $S_M$, through at least one arithmetic operator. In lattice-based in lattice-based cryptography the arithmetic operator may be a polynomial multiplication operator according to equations (14) and (15).

In step 1180, the arithmetic share components A and M are returned.

Figure 7:
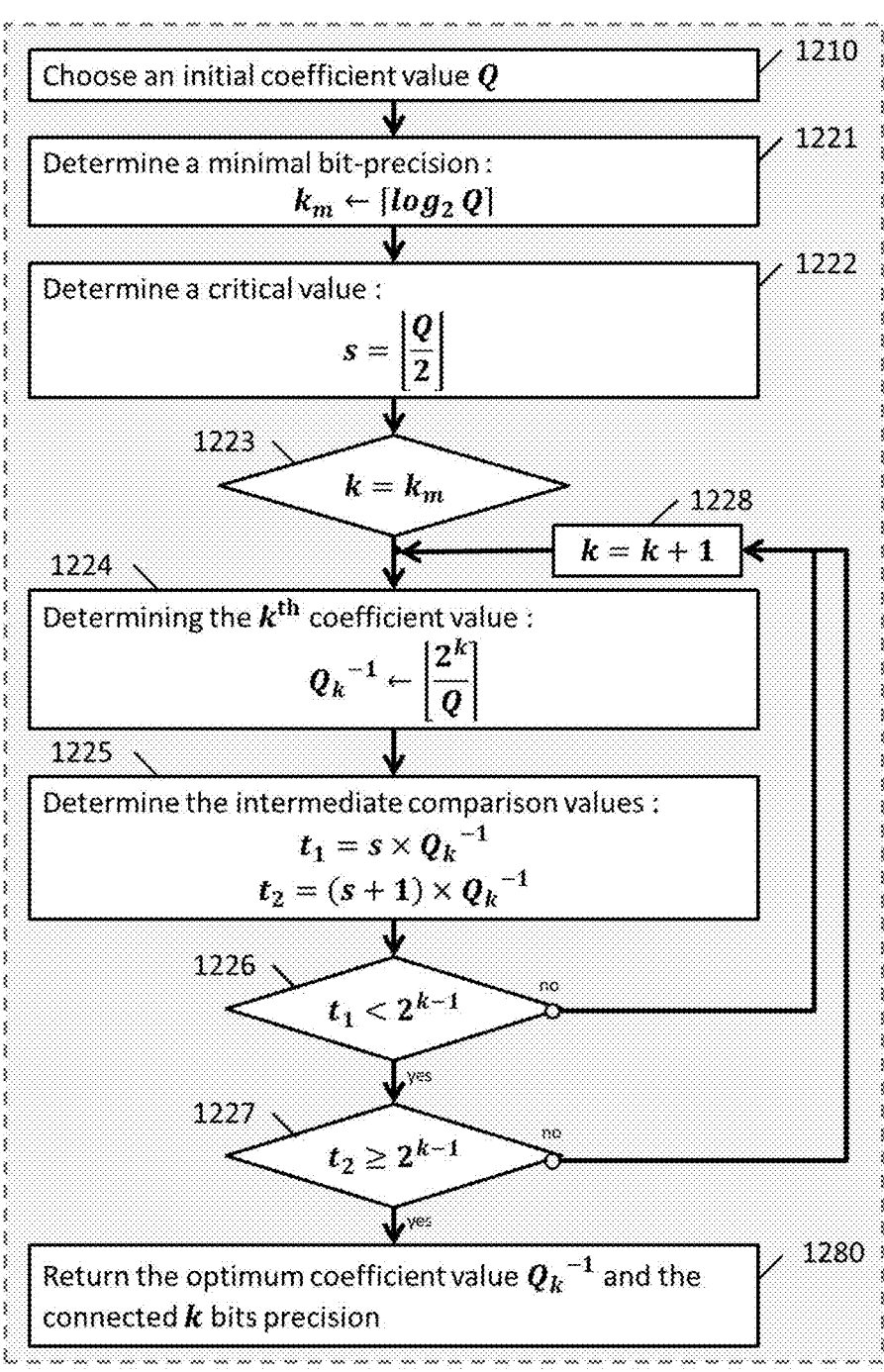
FIG. 7 is a flowchart depicting the steps for the optimal coefficient value determination used in lattice-based cryptography, according to certain embodiments.

FIG. 7 is a flowchart depicting the steps implemented by the additional computation processing unit 120 to iteratively determine the optimum coefficient value $$Q_k^{-1}$$

used in lattice-based cryptography, according to certain embodiments.

In step 1210, an initial coefficient value Q is chosen.

In step 1221, a minimal bit-precision $k_m$ is determined according to equation (21).

In step 1222, a critical value s is determined according to equation (22).

To iteratively determine the $$Q_k^{-1}$$

value, the method of FIG. 7 then proceeds with at least one iteration of steps 1224 to 1228 until the conditions related to the intermediate comparison values 1226 and 1227 are both satisfied for each current value of the bit-precision value k, the bit-precision value k being initially set to $k_m$ in step 1123 ($k=k_m$).

Each iteration comprises a step 1224 of determining the current value of $$Q_k^{-1}$$

according to equation (23) and a step 1225 of determining the intermediate comparison values $t_1$ and $t_2$, according to equations (24) and (25).

If at least one of the two conditions (26) and (27) related to the intermediate comparison values is not satisfied in steps 1226 and 1227, the bit-precision value k is incremented ($k=k+1$) and a new iteration is performed according to steps 1224 to 1225, with the new value of k.

Otherwise, if it is determined in steps 1226 and 1227 that both conditions (26) and (27) are satisfied, in step 1280, the optimum coefficient value $Q_k^{-1}$ and the value k corresponding to the last iteration are returned.

For a non-limiting example of the CRYSTALS-KYBER algorithm, the modulus Q is fixed to 3329 which is encoded using 12 bits. The minimal possible value $k^m$ is equal to 12

$$\left(\text{otherwise } Q_k^{-1} = 0\right)$$

and the critical value s is then equal to 1664. The value k obtained from the iterative computation is then equal to 20 and the optimum coefficient value $$Q_k^{-1}$$

equal to 315.

Figure 8:
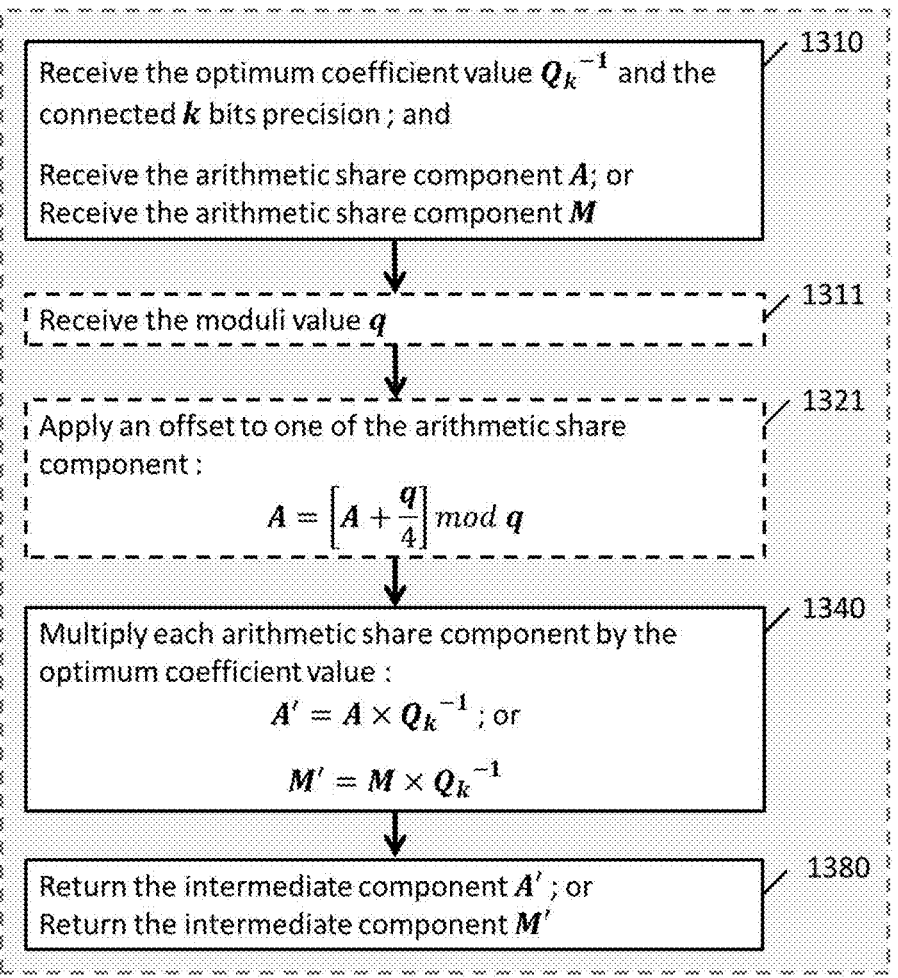
FIG. 8 is a flowchart depicting the steps performed to execute a multiplication operation using a multiplication coefficient corresponding to the optimal coefficient value, according to certain embodiments.

FIG. 8 is a flowchart depicting the steps of executing a multiplication operation using a factor defined by the optimum coefficient value $$Q_k^{-1}$$

in a lattice-based cryptography scheme, according to certain embodiments. These steps may be performed by the converting processing unit 130-1 and/or the converting processing unit 130-2.

In step 1310, the optimum coefficient value $$Q_k^{-1}$$

and the associated bits precision value k (as returned for example in step 1280 of FIG. 7), as well as the first arithmetic share component A or the second arithmetic share component M (as returned for example in step 1180 of FIG. 6) are received.

In step 1311, the modulus q is received (for the unit 130-1).

In step 1321, an offset is applied to the first arithmetic share component A according to equation (28).

In step 1340, each arithmetic share component is multiplied by the optimum coefficient value $$Q_k^{-1}$$

according equations (29) and (30), which provides the intermediate components A' and M'.

In step 1380, the intermediate components A' and M' are returned.

FIG. 9 is a flowchart depicting the steps for executing a Boolean sharing function (implemented for example by the second sharing processing unit 140), according to certain embodiments.

In step 1410, the first arithmetic share component A (or the intermediate components A respectively, determined for example according to the flowchart of FIG. 8) is received, together with a bit precision value $k_0$ (or respectively k, determined for example in step 1280 of FIG. 7).

In step 1440, a random component $A^{(0)}$ (or $A'^{(0)}$ respectively) is chosen based on the received bit-precision value $k_0$ (or respectively k). In step 1460, a Boolean sharing function is applied to the first arithmetic share component A (or respectively to the intermediate component A') according to equation (4).

In step 1480, the intermediate Boolean share component $A^{(1)}$ and the random component $A^{(0)}$ are returned.

FIG. 10 is a flowchart depicting the steps of performing a recursive carry computation function (implemented for example by the computation processing unit 160), according to certain embodiments.

In step 1610, the intermediate Boolean share components $A^{(1)}$ and the random component $A^{(0)}$ (as returned for example in step 1480 of FIG. 9), the second arithmetic share component M (or the intermediate component M' respectively, as returned for example in step 1380 of FIG. 8), and the bit precision value $k_0$ (or respectively k as returned for example in step 1120 of FIG. 7) are received.

In step 1621, the initial carry values $$C_0^{(0)}, C_0^{(1)}, \text{ and } C_0^{(2)}$$

are set. The initial carry values $$C_0^{(0)}, C_0^{(1)} \text{ and } C_0^{(2)}$$

may be set to class 0 (zero) for example according to equations (6).

The method of executing the recursive carry computation function may comprise one or more iterations of step 1623 for each value of an index i, i being initially set to 0 in step 1622.

For a current iteration corresponding to a current value of i, in step 1623, the three Boolean carry components $$C_{i+1}^{(0)}, C_{i+1}^{(1)} \text{ and } C_{i+1}^{(2)}$$

are determined according to equations (7), (8) and (9).

In step 1624, it is determined if i is equal to k−2. If not, the index i is incremented (i=i+1) in step 1625.

Otherwise, if i is equal to k−2 in step 1624, the iterations are terminated and in step 1640, the resulting Boolean share components $X^{(0)}$, $X^{(1)}$ and $X^{(2)}$ are determined according to equations (11), (12) and (13).

In step 1680, the three resulting Boolean share components $X^{(0)}$, $X^{(1)}$ and $X^{(2)}$ are returned.

Figure 11:
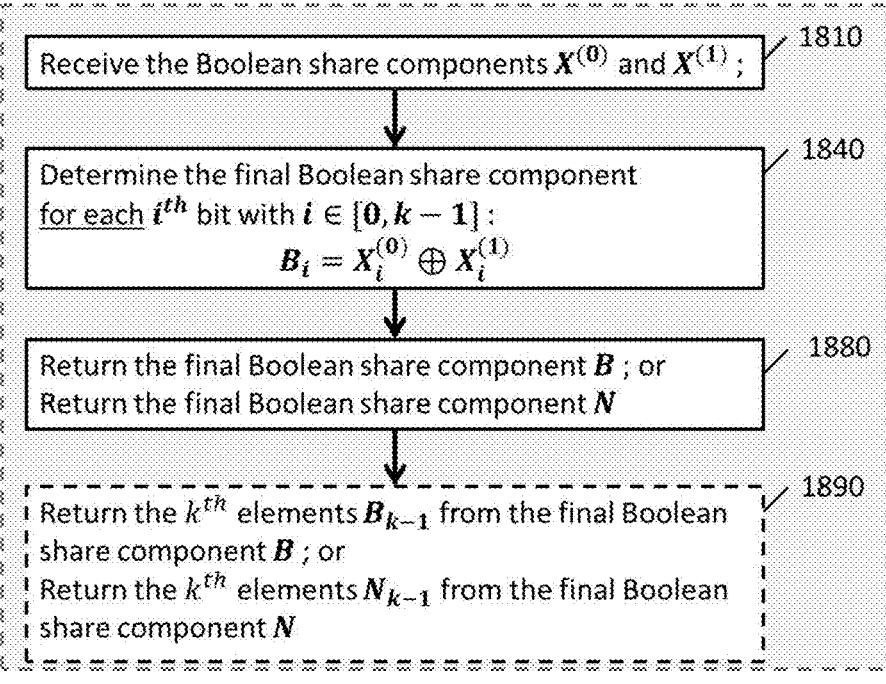
FIG. 11 is a flowchart depicting steps performed for final Boolean share component determination, according to certain embodiments.

FIG. 11 is a flowchart depicting the steps of determining the final Boolean share component determination (as implemented for example by the first evaluation processing units 180-1), according to certain embodiments.

In step 1810, the resulting Boolean share components $X^{(0)}$ and $X^{(1)}$ are received.

In step 1840, the final Boolean share component B is determined according to equation (31).

In step 1880, the final Boolean share component B is returned.

In an application of the invention to a lattice-based cryptography scheme, in step 1890, the bits $B_{k-1}$ and $N_{k-1}$ at position k are extracted from the final Boolean share components B and N. Step 1890 may be implemented for example in both first and second evaluation processing units 180-1 and 180-2.

The embodiments of the invention thereby provide an enhanced countermeasure that can significantly improve the resistance to fault injection of a cryptographic system. The invention applies in particular to any cryptographic system implemented in an embedded system, such as a smartcard, or in a M2M platform or a terminal in IoT architecture (Internet of Things).

More generally, the invention may be implemented in any device, system, or embedded system incorporating secret data and potentially exposed to side-channel and/or fault attacks, such as a smart card, a smart phone, a smart meter, a secure device, an embedded secure device, a multimedia player, a recorder, or a mobile storage device like memory cards and hard discs, the access to the any device, system or embedded system being monitored by the cryptosystem.

The device, system or embedded system may be used in a wide range of communication and data processing applications such as in the automotive industry (to ensure anti-theft protection), in service provider systems (to secure access cards by secure access solutions), in RFID™ tags and electronic keys, in mobile phone devices (to authenticate the control and access to resources such as batteries and accessories), in manufacturing of embedded devices and equipment (to provide a protection of hardware and software algorithms against cloning and reverse engineering), in payment domains such as banking schemes (to secure banking accounts and financial transactions), etc. It should be noted that the invention also ensure protection against particular attacks such as differential power analysis (based on power or electromagnetic emanation traces) and/or side-channel analysis which can be conducted by the time access on the micro-architecture (also referred to as cache attacks) and/or fault obtained by over solicitation of the memories (also called "Row Hammer" Attacks).

Embodiments of the present invention can take the form of an embodiment containing software only, hardware only or both hardware and software elements. In particular the processing units may be implemented as processors or in general purpose machines (e.g., hardwired look-up tables or "digital signal processors" embedded into Field Programmable Gates Array (FPGAs))

In general, the routines executed to implement the embodiments of the invention, implemented as part of an operating system and/or a specific application, component, program, object, module or sequence of instructions, or even a subset thereof, may be referred to herein as "computer program code", or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

While all of the disclosure has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described.

The invention claimed is:

1. A cryptographic system comprising: a plurality of processing units configured to execute operations of a cryptographic scheme, said cryptographic system incorporating secret data, said operations being applied to a data block u to generate a protected data block X, wherein said processing units comprise a first sharing processing unit configured to execute an arithmetic sharing function applied to said data block u using at least one secret key, and providing as an output a first arithmetic share component A and a second arithmetic share component M, wherein the processing units further comprise a second sharing processing unit and a computation processing unit, said second sharing processing unit being configured to determine a random component $A^{(0)}$, said second sharing processing unit being further configured to execute a Boolean sharing function applied to said first arithmetic share component A and to said random component $A^{(0)}$ and providing as an output an intermediate Boolean share component $A^{(1)}$, said computation processing unit being configured to execute a recursive carry computation function configured to compute a first Boolean share component $X^{(0)}$, a second Boolean share component $X^{(1)}$ and a third Boolean share component $X^{(2)}$ from said second arithmetic share component M, said random component $A^{(0)}$ and said intermediate Boolean share component $A^{(1)}$, and wherein said protected data block X being generated from said first Boolean share component $X^{(0)}$, said second Boolean share component $X^{(1)}$ and said third Boolean share component $X^{(2)}$, the system generating encrypted data corresponding to said protected data block, and said encrypted data being protected against side channels attacks and fault attacks.

2. The cryptographic system of claim 1, wherein said intermediate Boolean share component $A^{(1)}$ and said second arithmetic share component M are associated with a k bit-precision, said computation processing unit being configured to initialize three carry values $$C_0^{(0)}, C_0^{(1)}, \text{ and } C_0^{(2)}$$

to class zero, wherein the computation processing unit is configured to execute the recursive carry computation function by iteratively determining three carry components $$C_{i+1}^{(0)}, C_{i+1}^{(1)},$$

and $$C_{i+1}^{(2)}$$

for each index i, initially set to 0, until i=k−2, the index i being incremented for each next iteration, the three carry components $$C_{i+1}^{(0)}, C_{i+1}^{(1)}, \text{ and } C_{i+1}^{(2)}$$

at a current iteration corresponding to an index i being determined according to:

$$C_{i+1}^{(0)} = M_i \otimes \left(A_i^{(1)} \oplus C_i^{(1)} \oplus C_i^{(2)}\right) \oplus A_i^{(1)} \otimes \left(C_i^{(1)} \oplus C_i^{(2)}\right);$$

$$C_{i+1}^{(1)} = M_i \otimes \left(A_i^{(0)} \oplus C_i^{(0)}\right) \oplus A_i^{(0)} \otimes \left(C_i^{(0)} \oplus C_i^{(1)}\right); \text{ and}$$

$$C_{i+1}^{(2)} = A_i^{(1)} \otimes C_i^{(0)} \oplus A_i^{(0)} \otimes C_i^{(2)}; \text{ and}$$

wherein said computation processing unit is configured to determine the 3-sharing Boolean components $$X_i^{(0)}, X_i^{(1)} \text{ and } X_i^{(2)}$$

corresponding to each index i sharing Boolean components comprised between 0 and k according to:

$$X_i^{(0)} = C_i^{(0)} \oplus M_i;$$

$$X_i^{(1)} = C_i^{(1)} \oplus A_i^{(0)}; \text{ and}$$

$$X_i^{(2)} = C_i^{(2)} \oplus A_i^{(1)}.$$

3. The cryptographic system of claim 1, wherein said Boolean sharing function is executed for each $i^{th}$ bit corresponding to an index $i \in [0, k-1]$ according to the following equation:

$$A_i^{(1)} = A_i^{(0)} \oplus A_i.$$

4. The cryptographic system of claim 1, wherein said cryptographic scheme is a lattice-based cryptography scheme.

5. The cryptographic system of claim 4, wherein said random component $A^{(0)}$ being determined with a bit-precision value k and wherein said cryptographic system further comprises an additional computation processing unit configured to determine an optimum coefficient value $Q_k^{-1}$ from an initial coefficient value Q chosen from prime numbers, and to provide the bit-precision value k.

6. The cryptographic system of claim 5, wherein said additional computation processing unit is configured to initially set an initial value $k_m$ of said bit-precision value k to $\lceil \log_2 Q \rceil$ rmine a critical value s as $$s = \left\lfloor \frac{Q}{2} \right\rfloor,$$

and wherein said additional computation processing unit is configured to determine said optimum coefficient value $Q_k^{-1}$ by iteratively computing, for each value k, k being initially set to $k_m$ and being incremented for each next iteration:
a coefficient value $Q_k^{-1}$ corresponding to the current value of k according as $$\left\lfloor \frac{2^k}{Q} \right\rceil,$$

two intermediate comparison values $$t_1 = s \times Q_k^{-1} \text{ and } t_2 = (s+1) \times Q_k^{-1},$$

the iterations being terminated if $t_1 < 2^{k-1}$ and $t_2 \geq 2^{k-1}$, the coefficient value $$Q_k^{-1}$$

and the bit-precision value k corresponding to the last iteration being returned by the additional computation processing unit.

7. The cryptographic system of claim 5, wherein said cryptographic system further comprises two converting processing units configured to multiply respectively each of the two arithmetic share components A and M by said optimum coefficient value $$Q_k^{-1}.$$

8. The cryptographic system of claim 7, wherein said converting processing unit is further configured to apply a $$\left\lfloor \frac{q}{4} \right\rfloor$$

offset to the first arithmetic share component A.

9. The cryptographic system of claim 4, wherein said cryptographic system further comprises a first evaluation processing unit and a second evaluation processing unit, the first evaluation processing unit being configured to determine a first final boolean share component B comprising a set of elements $B_i$, $i \in [0, k-1]$, each component $B_i$ being determined as $$B_i = X_i^{(0)} \oplus X_i^{(1)},$$

and wherein the second evaluation processing unit is configured to determine a second final boolean share component N comprising a set of elements $N_i$, $i \in [0, k]$, each component Ni being determined equal to said third Boolean share component $X_i^{(2)}$,
and wherein said first and second evaluation processing units are configured to return the $k^{th}$ elements $B_{k-1}$ and $N_{k-1}$ of the first final boolean share component and of the first final boolean share component.

10. The cryptographic system of claim 1, wherein said second sharing processing unit and said computation processing unit comprise electronic circuits comprising electronic logic gate.

11. A method of executing operations of a cryptographic scheme, said method being implemented in a cryptographic system incorporating secret data and comprising a plurality of processing units, said operations being applied to a data block u to generate a protected data block X, the method comprising the step of executing, by said processing units, an arithmetic sharing function applied to a data block u and providing as an output a first arithmetic share component A and a second arithmetic share component M, wherein the method comprises the steps of:
determining, by said processing units, a random component $A^{(0)}$ with a bit-precision value k, and executing a Boolean sharing function to said first arithmetic share component A and to said random component $A^{(0)}$ and providing as an output an intermediate Boolean share component $A^{(1)}$,
executing, by said processing units, a recursive carry computation configured to compute a first Boolean share component $X^{(0)}$, a second Boolean share component $X^{(1)}$ and a third Boolean share component $X^{(2)}$ from said second arithmetic share component M, said random component $A^{(0)}$ and said intermediate Boolean share component $A^{(1)}$, the method generating encrypted data corresponding to said protected data block, said encrypted data being protected against side channels attacks and fault attacks.

12. A method of claim 11, wherein said intermediate Boolean share $A^{(1)}$ and said second arithmetic share component M are associated to said k bit-precision, the method comprising the step of initializing to class zero three carry values $$C_0^{(0)}, C_0^{(1)}, \text{ and } C_0^{(2)},$$

wherein said recursive carry computation comprises the step of iteratively determining, by said processing units, three carry components $$C_{i+1}^{(0)}, C_{i+1}^{(1)} \text{ and } C_{i+1}^{(2)}$$

for each index i, initially set to 0, until i=k−2, the index i being incremented for each next iteration, the three carry components $$C_{i+1}^{(0)}, C_{i+1}^{(1)}, \text{ and } C_{i+1}^{(2)}$$

at a current iteration corresponding to an index i being determined according to:

$$C_{i+1}^{(0)} = M_i \otimes \left( A_i^{(1)} \oplus C_i^{(1)} \oplus C_i^{(2)} \right) \oplus A_i^{(1)} \otimes \left( C_i^{(1)} \oplus C_i^{(2)} \right);$$

$$C_{i+1}^{(1)} = M_i \otimes \left( A_i^{(0)} \oplus C_i^{(0)} \right) \oplus A_i^{(0)} \otimes \left( C_i^{(0)} \oplus C_i^{(1)} \right); \text{ and}$$

$$C_{i+1}^{(2)} = A_i^{(1)} \otimes C_i^{(0)} \oplus A_i^{(0)} \otimes C_i^{(2)}; \text{ and}$$

wherein the method comprises the step of determining, by said processing units, the 3-sharing boolean components $$X_i^{(0)}, X_i^{(1)} \text{ and } X_i^{(2)}$$

corresponding to each index i comprised between 0 and k according to:

$$X_i^{(0)} = C_i^{(0)} \oplus M_i;$$

$$X_i^{(1)} = C_i^{(1)} \oplus A_i^{(0)}, \text{ and}$$

$$X_i^{(2)} = C_i^{(2)} \oplus A_i^{(1)}.$$

13. A method of claim 11, wherein said Boolean sharing function comprise the step of executing, by said processing units, for each $i^{th}$ bit corresponding to an index $i \in [0, k-1]$ the following equation $$A_i^{(1)} = A_i^{(0)} \oplus A_i.$$

\* \* \* \* \*